United States Patent [19]
Piccione

[11] 3,771,049
[45] Nov. 6, 1973

[54] FAULT INDICATOR AND LOCATOR FOR BURIED CABLES AND ZERO SEQUENCE CURRENT SENSING DEVICE

[75] Inventor: Nicholas E. Piccione, Smithtown, N.Y.

[73] Assignee: Dossert Manufacturing Corporation, Brooklyn, N.Y.

[22] Filed: Jan. 5, 1971

[21] Appl. No.: 104,102

Related U.S. Application Data

[63] Continuation-in-part of Ser. No. 864,919, June 17, 1969, abandoned, which is a continuation-in-part of Ser. No. 669,101, Sept. 20, 1967, abandoned.

[52] U.S. Cl............. 324/51, 324/52, 324/122, 324/127, 324/133, 340/253 R
[51] Int. Cl............. G01r 31/02, G01r 31/08
[58] Field of Search............. 324/51, 127, 133, 324/122, 67, 52, 111; 340/248, 250, 253, 255; 174/11

[56] References Cited
UNITED STATES PATENTS

| 3,181,350 | 5/1965 | Thomas et al. | 324/111 X |
| 3,611,339 | 10/1971 | Richey | 340/253 A |
| 2,433,505 | 12/1947 | Bennett et al. | 174/11 R |
| 2,581,308 | 1/1952 | Smith | 340/250 X |
| 2,709,800 | 5/1955 | Temple et al. | 324/127 X |
| 2,802,182 | 8/1957 | Godshalk et al. | 324/127 X |
| 3,022,498 | 2/1962 | Alcott | 340/253 |
| 3,086,069 | 4/1963 | Kolmorgen | 174/11 R |
| 3,253,215 | 5/1966 | Moakler et al. | 324/51 |
| 3,271,673 | 9/1966 | Woroble | 324/122 X |
| 3,331,018 | 7/1967 | Farina | 324/51 |
| 3,383,588 | 5/1968 | Stoll et al. | 324/51 |
| 3,524,133 | 8/1970 | Arndt | 324/133 X |

Primary Examiner—Gerard R. Strecker
Attorney—Nolte & Nolte

[57] ABSTRACT

An underground cable fault indicator and locater is provided to indicate the location of a fault or short circuit in the cable. The cable is passed through the apertures of a plurality of spaced transformer sensors connected to indicating elements located in below grade vaults or above the ground. Upon the occurrence of a fault in the cable, the indicating elements provide a visual indication of the section of the cable in which the fault has occurred.

6 Claims, 15 Drawing Figures

INVENTOR
NICHOLAS E. PICCIONE
BY
Nolte & Nolte
ATTORNEYS

INVENTOR
NICHOLAS E. PICCIONE

BY *Nolte & Nolte*

ATTORNEYS

INVENTOR.
NICHOLAS E. PICCIONE
BY Nolte & Nolte
ATTORNEYS

FAULT INDICATOR AND LOCATOR FOR BURIED CABLES AND ZERO SEQUENCE CURRENT SENSING DEVICE

BACKGROUND OF THE INVENTION

This application is a continuation-in-part of my application Ser. No. 864,919 filed on June 17, 1969, which in turn is a continuation-in-part of my application Ser. No. 669,101, filed on Sept. 20, 1967, both now abandoned, for a Fault Indicator and Locator for Buried Cables and Zero Sequence Current Sensing Device.

This invention relates generally to fault indicating and locating devices, and in particular to a fault indicating and locating device for use with underground cables.

DESCRIPTION OF THE PRIOR ART

With the increasing development of underground electrical distribution systems and the accompanying practice of directly burying the primary and secondary feeder cables, there has arisen a need for an improved apparatus for determining the location of a short circuit or a fault in the cable or any electrical equipment connected thereto.

Cables of the type used in underground (or underwater) distribution systems generally are covered by an insulating layer. Such cables may become subject to instantaneous surges of high current flowing to the surrounding medium due to either the complete loss of dielectric of a deteriorating insulation, a connection burn out, or accidental penetration of the cable insulation. My unit will not foretell pending trouble. A damaging fault must occur for appropriate magnitude of current to make my unit work.

One known method for detecting and locating faults in buried cables requires the application of an external source of currect to the cable. A pair of probes is driven into the ground which are then moved along the length of the cable. At the location of the fault the current from the source is conducted to the ground and there detected by a detector carried by the probes to identify the location of the fault.

The obvious drawback of this and other similar fault locating apparatus is the requirement of an external energy source and the need for the placing of the detecting devices into the ground each time the fault locating operation is performed.

SUMMARY OF THE INVENTION

It is therefore a general object of this invention to provide a fault indicator and locator which is permanently situated at a position remote from the cable.

It is a further object of this invention to provide a fault indicator and locator a portion of which is permanently buried within the medium in which the cable is placed or installed on the cable in a cable manhole or splice box.

It is also an object of this invention to provide a fault indicator and locator which provides and retains a visual indication of the presence of a fault in an underground or submerged cable even after line protecting devices have isolated a faulted line from its power source.

It is yet a further object of this invention to provide a fault indicator and locator which need not be directly connected to the buried electric cable.

It is another object of this invention to provide a fault indicator and locator which does not require an external current source or measuring instrument and which may alternatively be utilized with either single phase and three phase systems conducting at either high or low voltage levels.

It is a further object of this invention to provide a fault indicator and locator which may be installed, removed or relocated along the length of a buried continuous electrical cable without cutting or interrupting the cable, and which may be installed while the cable is under load conditions.

It is yet a further object of this invention to provide a fault indicator and locator which may be handled with complete safety even when the cable is under normal or faulted loads.

It is an additional object of this invention that by employing a plurality of such fault indicators and locators, the locations of a fault within one of a number of prescribed intervals of cable length can be readily determined.

By the use of the fault indiator of this invention the shorted or faulted portion of the cable and/or electrical equipment can be quickly and readily determined within a known section of the cable. In this manner the task of locating the fault along the cable is reduced by confining the search to only the section of the cable in which the fault is located by this invention.

The aforementioned objects and advantages are achieved according to the present invention by placing a plurality of current sensors along the length of the cable in inductive relationship therewith. Each of the sensors is connected to a remote visual indicating element which is observed by the technician. When a fault occurs in the cable, the sensors disposed along the cable between the energy source and the fault will sense the fault current. The indicating elements associated with these sensors will thus provide a visual indication of the presence of the fault. The sensors disposed at along the cable at the other side of the fault will not sense the fault current and their associated indicating elements will not provide a corresponding visual indication. By examining the state of the various indicating elements the fault is then located as lying along the section of the cable between the two sensors associated with the pair of adjacent indicating elements giving opposing indications.

In another feature of this invention, the sensor may be used, in a three-phase transmission system along with supplemental relays and circuit breaker equipment, as a zero sequence current sensing device to detect current leakage between the polyphase conductors and ground. The inherent sensitivity of the sensor will cause it to respond to low level leakage currents. To increase the sensitivity of the sensor to leakage currents, the turns ratio of the sensor would be modified from the sensor which is utilized in the fault indicator and locator in connection with a single power cable. The leakage currents will induce a current in the sensor secondary winding of sufficient magnitude to actuate auxiliary relays, which in turn, will actuate the trip coils of circuit breakers. It is, therefore, possible for this modified system to detect and clear a phase to ground fault.

According to still another feature of the invention, the current sensors comprise energy storage circuits for storing voltages related to the cable current, and blinking indicator circuits responsive to voltages above a given level connected to the energy storage circuits. The indicator circuits may include operator actuated switches, such as magnetically operated microswitches, for controlling the operation of the indicator circuits. Alternatively, the magnetically operated microswitches may be additionally controlled automatically by a power source responsive to the cable current, in order to automatically restore the circuit to a non-indicating condition when normal current flow is restored in the cable.

The invention may best be understood by reference to the following description taken in connection with the accompanying drawings.

Figure 1:
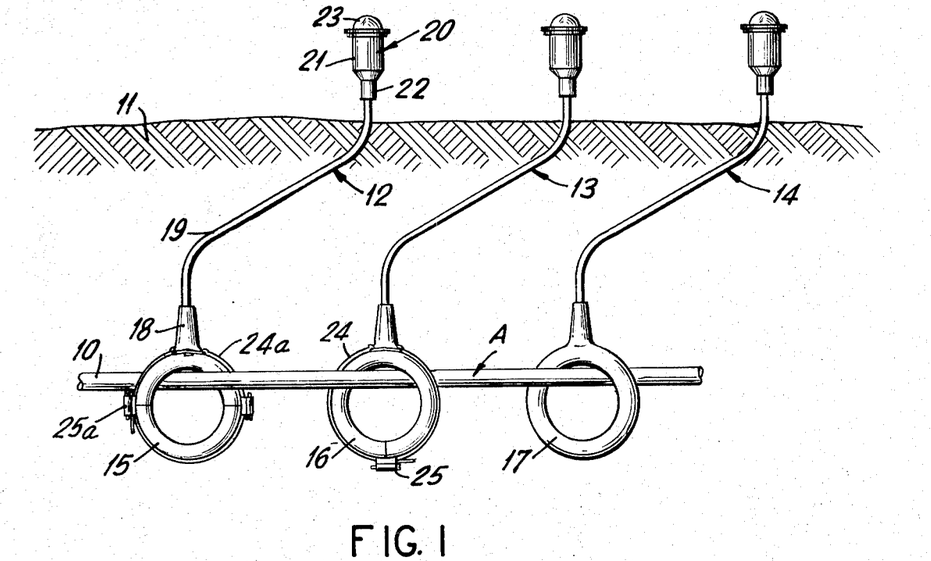
FIG. 1 is a schematic view of the cable fault detector illustrating the principles of fault detection and location in accordance with the present invention.

Referring to FIG. 1 of the drawings, a cable 10 is shown buried in the ground 11. The cable 10 may comprise either of single phase conductor covered by an insulating material, or a three phase cable, also having suitable insulating material thereon.

At any point along cable 10 a fault in the insulation may occur causing the eventual breakdown of the cable. It is the purpose of the fault detector and locator of this invention to indicate that a fault is present and to direct the technician or repair worker to the section of the cable wherein the fault is located.

The fault indicator and locator of this invention is composed of three elements. In FIG. 1 three such fault locators 12, 13 and 14 are shown disposed at substantially equal distances along the length of cable 10. It is to be understood that any desired number of fault locators may be utilized and the spacing between adjacent fault locators need not necessarily be equal.

Fault locators 12, 13 and 14 comprise a transformer sensor 15, 16 and 17 respectively. Each sensor is shown as being of a different type for purposes of describing these sensors. In the embodiment of the invention employing the fault indicator illustrated in FIG. 6, it is preferred that the transformer sensor be in the form of a current transformer, for reasons that will be discussed in more detail in the following disclosure, while in the arrangements of FIGS. 9-11, it is preferred that the transformer sensor be a potential transformer.

In certain applications of the invention different types of sensors may be advantageously used. However, in any given embodiment of this invention, each of the sensors would generally be of the same type.

Each of the sensors 15, 16 and 17 is essentially a toroidal transformer disposed about the cable 10 in the manner shown in FIG. 1. Each sensor 15, 16 and 17 comprises a plurality of conductor turns wound in a toroidal manner about a magnetic steel core. The conductor turns, acting as a secondary winding of a transformer, reflect the induced current flowing through the cable 10 acting as the primary winding, in accordance with the turns ratio between the primary and secondary windings in a known manner. Each sensor is completely enclosed within a suitable waterproof resilient thermoplastic or thermosetting insulation material 18 which is able to resist corrosion by the environment in which the cable 10 is submerged. Insulating material 18 exhibits adequate dielectric and physical strength and is capable of resisting the natural environmental conditions above or below the ground surface. Insulating material 18 is also sufficiently inert to resist any unusual exposure to subterranean acids, salts, alkalis, oils or other deleterious hydrocarbons. Insulating material 18 is further capable of resisting physical abuses which would occur during the field installation and burial of the cable 10 and must possess sufficient surface hardness to resist compressive forces caused by ground settling and any abuse caused by undue bearing stress brought about by rocks or foreign objects or by the action of frost.

The construction of the various types of sensors will be described more completely in a later part of this description.

The conductors of each sensor 15, 16 and 17 are connected to an insulated cable 19 of sufficient length depending on the depth at which the cable 10 is buried and convenient location of indicating element 20. Cable 19 comprises a pair of insulated flexible conductors. The cable 19 is also completely waterproof and has resistance to environmental conditions the same as the insulation 18 of the sensor. A suitable waterproof joint is provided between the cable 19 and the sensor, for example, by molding or by the use of suitable clamps. The thickness of the conductors of cable 19 depends upon such factors as the diameter and number of turns of the sensor winding, as well as the required mechanical strength of the cable 19.

A fault indicating element 20 is connected to the other end of each cable 19, preferably though not necessarily at a location above the ground. Indicating element 20 provides a visual indication of the presence of a fault in cable 10. Indicating element 20, several embodiments of which will be described in greater detail below, is provided with an indicating or recording device capable of providing a visual indication when the current induced in the sensor to which it is connected exceeds a predetermined level. Such a current can be caused, for example, by the presence of a fault in cable 10 or any electrical equipment connected thereto. The indicating element 20 also must have the ability to maintain its indication after the cable 10 has been de-energized by means of fuses or circuit breakers caused to operate when the fault occurs. The indicating element 20 must also be able to discriminate between normal load currents and overload currents and the fault current, in that the indicator will operate only at the magnitude of current induced in the sensor by the fault current. Indicating element 20 is preferably also housed in a waterproof housing 20 capable of withstanding the same environmental conditions above or below ground as the sensor, and is connected to the cable 19 by a waterproof bond, seal or gland device 22 also capable of withstanding this environment. Indicating element 20 is provided with a transparent viewing window such as a dome 23 to permit the viewer to readily see the condition of the indicator.

The principles of operation of the fault detector and locator of this invention may now be described with reference once again to FIG. 1. For purposes of this description it will be assumed that the current in cable 10 flows from a source located at the left of FIG. 1 in a direction towards the right of FIG. 1. It will also be assumed that the fault has occurred at a point A on cable 10 located between sensors 16 and 17. Fault current thus flows through cable 10 from the source to point A. Thus, sensors 15 and 16 would have induced in their windings a current proportional to the fault current. No current will be induced in sensor 17 by fault current in the described fault condition. The indicating element 20 connected by means of cables 19 to sensors 15 and 16 will thus provide a visual indication of the presence of fault current while the indicating element 20 connected to sensor 17 will provide no indication of this type. From an examination of the three indicators, it can thus be determined that the fault must lie somewhere between sensors 16 and 17, as the adjacent indicating elements 20 connected to these sensors provide opposing indications.

In FIG. 1 sensor 17 is of the solid type. The solid type sensor 17 is a current transformer consisting of a toroidal form of laminated or powdered high permeability metal upon which is wound a secondary winding of small guage insulated wire in the proper turns ratio to establish the necessary voltage and current to actuate the indicating element 20 durin the cable fault period. The current transformer 17 is so designed with respect to its core, turns ratio, and gauge of secondary conductor, that the open circuit voltage is of an insufficient magnitude to cause personal injury. In a preferred embodiment of the invention, the core of the current transformer is saturable, so that the output of the transformer is fully responsive to the cable current within an adequate range to permit indication of a fault current by the indicator, but the core saturates before the potential at the output of the transformer reaches a level that would be dangerous to personnel.

The split type transformer sensor 16 is also a current transformer, and encompasses all of the design characteristics of the solid type transformer 17. This modification enables the fault indicator and locator of this invention to be installed along a continuous run of cable 10 without the need of cutting and splicing the cable to introduce the current transformer sensor 16. The split type current transformer sensor 16 is constructed so that the core can be separated by the inherent flexibility of the laminates and insulating covering and then brought together and held in closed position to give identical performance. to that of the solid sensor 17. The maintaining of the split type current transformer sensor 16 in the closed position is readily accomplished by the use of a resilient band type, metallic or non-metallic corrosion-resistant or plastic strap 24 arranged about the circumference of sensor 16 having an incorporated locking device 25 positioned at the gap point of the core. Sensor 15 is of the sectional type wherein the core is comprised of two identical semi-circular portions secured together by means of a pair of resilient bands 24a secured to one another by locking device 25a to form a toroidal current transformer as shown in FIG. 1, with the characteristics of sensors 16 and 17.

Figure 2:
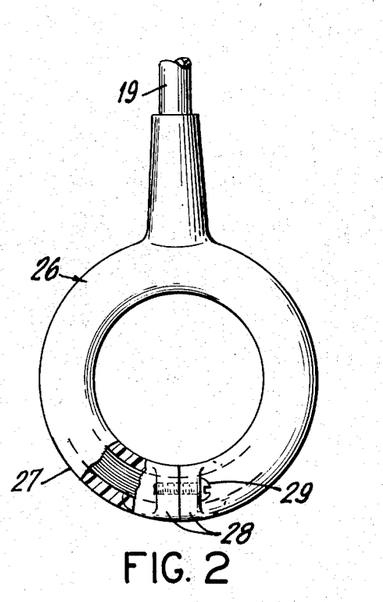
FIG. 2 is a fragmentary drawing illustrating one embodiment of a fault sensor utilized in the present invention.

In the embodiment shown in FIG. 2 the transformer sensor 26 comprises a waterproof molded plastic encapsulation 27 integrally bonded to each free end of the core and provided with projecting ears 28 having holes to accommodate screw type fasteners 29 to secure the sensor 26 in the closed position.

Figure 3:
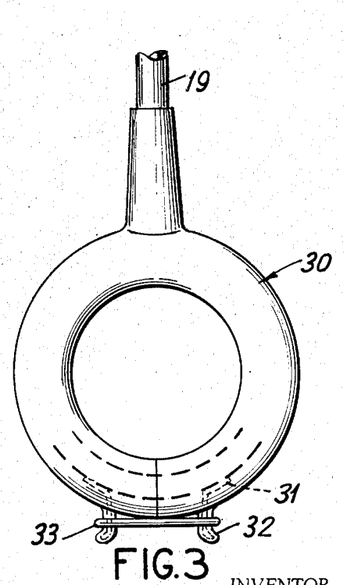
FIG. 3 is a drawing similar to FIG. 2 illustrating a second embodiment of a fault sensor.

In the embodiment of the sensor shown in FIG. 3 the sensor 30 has its core provided with a band 31 having projecting hooks 32 at its free ends and positioned at the gap with the closing action accomplished by means of elastomeric bands 33 wound over projecting hooks 32.

Figure 4:
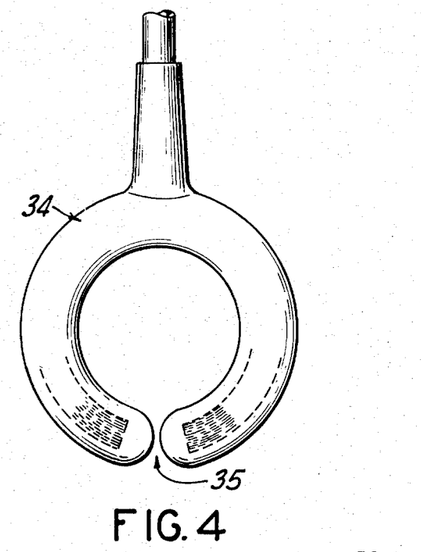
FIGS. 4 and 5 are drawings similar to FIGS. 2 and 3 illustrating other embodiments of a fault sensor.

Another form of a transformer sensor is shown in FIG. 4 wherein sensor 34 is of the split or segmented type which can operate without the split faces or segment faces of the core making physical contact with each other. This arrangement would assure complete encapsulation and protection against environmental influences above or below ground level without the need of gaskets, seals, or glands. The somewhat diminished electrical response of this modification having a fixed gap 35 would be offset by compensating measures such as by increasing the size of the core, changing the secondary winding turns ratio or conductor size, or reducing the duty of the indicating devices. This arrangement is also particularly suitable as a potential transformer, for use in the embodiments of the invention illustrated in FIGS. 9–13.

Figure 5:
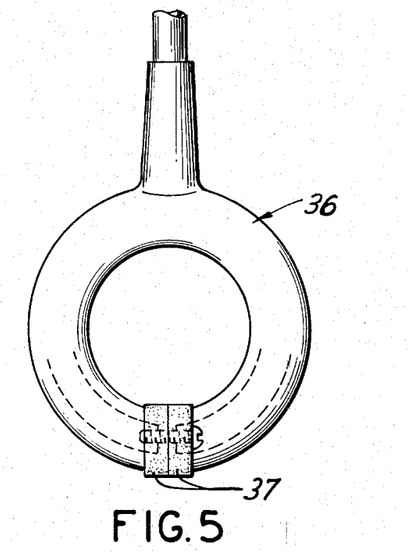

The sensor 36, illustrated in FIG. 5, is also of the split or segmented type which can operate without the split faces or segment faces of the core making physical contact with each other, as in the embodiments of FIG. 4, except that in order to improve the electrical efficiency of this sensor, the free ends of the split or segmented core are encapsulated with a thermo-plastic or thermo-setting insulation material 37 which is impregnated with a high permeability powder.

Figure 6:
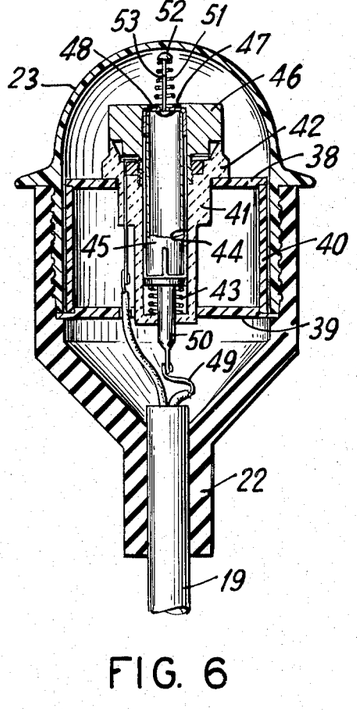
FIG. 6 is a vertical section of one fault indicator which may be utilized in the present invention.

FIG. 6 illustrates a preferred embodiment of a fault indicating element 20 of the calibrated indicating element type. In the embodiment shown in FIG. 6 a transparent plexiglass or similar material viewing dome 23 is secured in a waterproof manner on the end of housing 22. For example, the housing 22 may be a thick walled generally cylindrical member of, for example, molded rubber, having an open end into which a cylindrical projection on the dome 23 extends. The fit between these members is sufficiently tight that the joint is waterproofed, but still loose enough to enable the removal of the dome by an operator. The cylindrical end of the dome member 23 may have annular ridges on its outer surface to facilitate a proper seal, and a water proof sealing compound such as silicone grease may be provided on the member 23 to insure the waterproof seal. In order to facilitate removal of the dome member 23, an enlarged annular ridge may be provided between the dome end and the cylindrical end thereof so that an operator can firmly grasp the member. The other end of the member 22 has a reduced diameter, and it is sealed, for example, by molding or clamping to the cable 19. A pair of plastic discs 38 and 39 separated by a plastic collar 40, are mounted coaxially within housing 22, with the lower disk 39 extending radially to the inner wall of the housing 22. The lower disk 39 may rest on a shoulder within the housing 22, so that the lower end of the cylindrical portion of the dome 23 urges the disk 39 against the shoulder of the housing when the unit is assembled. The disks 38 and 39 are bonded to the collar 40 by any suitable means. Central openings are provided within discs 38 and 39 and a fuse holder 41 of insulating material and having an axial bore 44 fixedly mounted into these openings. An annular flange 42 on holder 41 rests on the upper surface of disc 38 and supports fuse holder 41 in position. A spring 43 is under compression within bore 44 in fuse holder 41 to assure sound electrical contact at each end of a fuse 45 which is placed within bore 44 and rests on spring 43. Fuse 45 is of the indicating type. A removable knurled knob 46, having a central opening 47 and an annular shoulder 48 is placed over fuse holder 41 and encircles the upper portion of fuse 45 so that the shoulder 38 urges the fuse downwardly. Conductor 49 of cable 19 is connected to the lower end of fuse 45 by means of a contact 50 around which spring 43 is disposed. Spring 43 urges fuse 45 upwards against the restraint of shoulder 48. The other conductor of cable 19 is connected to the upper end of the fuse by means of a contact extending in the body of the fuse holder and contacting a conductive portion in the knob 46.

Fuse 45 comprises a narrow, internally located, axial stem 51 carrying a colored, opaque cap 52 at its upper end. When fuse 45 is in the normal or unblown condition, a thin, metal fuse wire (not shown), connected between stem 51 and the lower fuse cap, retains stem 51 and cap 52 in a fixed position wherein cap 52 is disposed adjacent to opening 47 in knob 46. A compression spring, surrounding stem 51, is maintained under compression beneath cap 52 so long as the fuse wire remains intact.

The metal fuse wire is of a thickness and strength to enable the wire to retain stem 51 in position while carrying currents corresponding to normal or overload values in cable 10 without breaking or severing. The presence of a fault current induced in the sensor with which the indicating element is connected, will cause the fuse wire to blow or sever in a known manner, thus releasing the compression force on spring 53 exerted by cap 52. The resulting expansion of spring 53 urges stem 51 and cap 52 upwards against the interior surface of transparent dome 23, to thereby provide a permanent visual indication of the presence of fault current, as colored cap 52 becomes directly and readily visible through dome 23. In view of the use of a dome indicator in this embodiment of the invention, it is extremely easy to determine the occurence of fault current.

Stem 51 is secured to the expended fuse 45 which can thus be removed as a unitary assembly.

All indicating elements, associated with sensors located along cable 10 between the generator source and the location of the fault will provide visual indications of this type, while the remaining indicating elements, associated with sensors disposed along cable 10 at the other side of the fault will remain unaffected by the fault current. In the latter group of indicating elements the colored cap will not be visible. In this manner, the location of the fault in cable 10 can be immediately and directly located as lying between adjacent indicating elements providing opposing visual indication.

The colored cap in those indicating elements giving an indication of a fault, will remain visible until the expended fuse and cap assembly in the indicating element has been replaced after the fault has been located and corrected. Therefore, a continuous indication of the presence of a fault in cable 10 is provided even when fault current in cable 10 has been interrupted by line protecting devices.

When a fault indicator is employed to indicate faults according to the invention, it is of course important that the indicator respond to the occurrence of a fault faster than any line protecting devices, such as power fuses and circuit breakers, since otherwise the cable currents would be removed before the indicator had operated. The arrangement of FIG. 6 in combination with the previously described current transformers, is specially adaptable from this standpoint. The current transformer has a very low impedance, due to tight coupling, and thus the over all circuit has a very low value of a.c. impedance, so that operation of the indicating element is completely responsive to fault currents at a rate faster than normal circuit protection equipment. The fusable element of the device may thus be readily selected to obtain the desired timemagnitude characteristics for a given application, without the necessity of complex calculation to adjust the rate of operation to insure indication of a fault before operation of associated circuit breakers. The arrangement also has the further advantage that it requires a minimum of maintenance, and has a minimum of moving parts. The device is readily made in waterproof form, and is not easily damaged. Thses characteristics are desirable, since the fault indicators must be positioned, in many instances in remote areas, so that continual servicing the maintenance would be undesirable. Furthermore, when the voltage at the device is limited, for example by the use of a saturable core, there is substantially no danger of injury to personnel.

Figure 7:
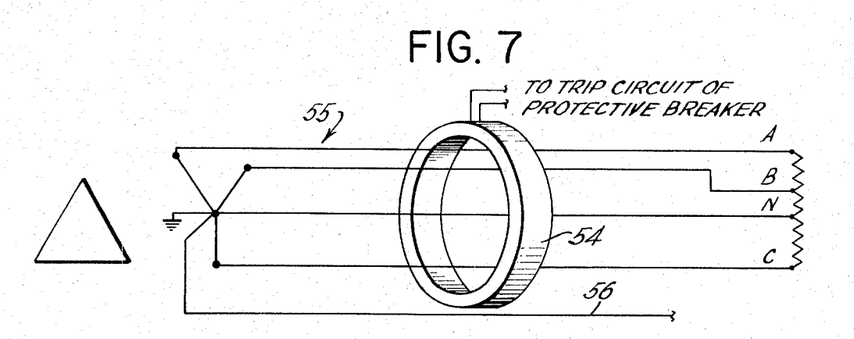
FIG. 7 is a schematic diagram showing a modification of this invention as a zero sequence current sensing device for a polyphase transmission system.

In FIG. 7 of the drawings a modification of the present invention is shown, wherein a sensor element 54 is disposed around the conductors of a three-phase network which is the illustrated example is a wyeconnected transmission network. The wye-connected network shown schematically in FIG. 7 comprises the three phase conductors A, B and C carrying power to an external load L. An insulated current carrying neutral conductor N, insulated from ground at the lad L is connected between the common connection of the phase conductors A, B and C, and the load L.

The sensor 54, used in the embodiment of FIG. 7 as a zero sequence current sensing device to detect current leakage from the phase to ground, is similar to that described with reference to the previously described embodiments. However, to achieve the greater sensitivity required to detect the presence of a ground fault or phase leak, the turns ratio of sensor 54 is modified to achieve maximum sensitivity.

In conventional polyphase networks or power distribution systems, it is difficult to detect the presence of arcing faults between phase and ground, as it is difficult to distinguish between currents caused by arcing faults and overload currents. To overcome this drawback, the sensor 54 is arranged with respect to network 55 as shown in FIG. 7 so that the low level currents caused by leakage from phase to ground will induce a current in sensor 54.

The current induced in sensor 54 by the presence of an arcing phase to ground current is of sufficient magnitude to actuate an auxiliary relay which operates the trip coil of a conventional circuit breaker (not shown) to which sensor 54 is electrically connected. The circuit breaker is arranged such that actuation of the circuit breaker will remove network 55 from the power source. A bare wire 56 may be provided to the grounded neutral of the wye-connected network, for preparing of bonding or case grounds.

Figures 8, 10:
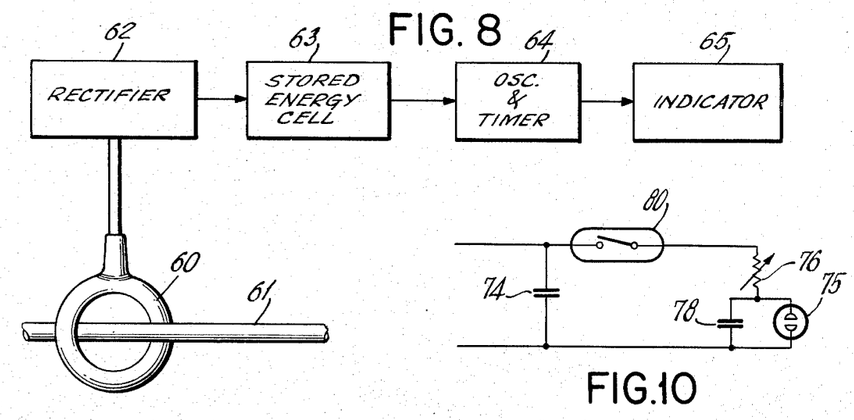
FIG. 8 is a block diagram of another embodiment of a fault indicator which may be employed in the present invention.
FIG. 10 is a circuit diagram of a preferred embodiment of the circuit of FIG. 9.

In another embodiment of my invention, as illustrated in FIG. 8, a transformer sensor 60 which may be any of the types heretofore described, is provided surrounding the cable 61, and is connected to a rectifier circuit 62. The rectifier circuit 62, which is preferably comprised of a full wave rectifier, is connected to a stored energy cell 63, for storing a voltage proportional to the current flow in the cable 61. The voltage on the stored energy cell 63 is applied to an oscillator and timer circuit 64. The oscillator and timer circuit 64 applies an oscillatory voltage to an indicator circuit 65 upon the occurrence of a current in cable 61 exceeding a predetermined maximum level. The stored energy cell 63 maintains its charge for a predetermined time (e.g., 8 hours) after the current in cable 61 has been interrupted. This permits workmen sufficient time to inspect the indicators disposed along the cable, in order to locate the fault. Thus, a blinking indicator indicates that a fault current has flowed in the corresponding section of the cable 61.

Figure 9:
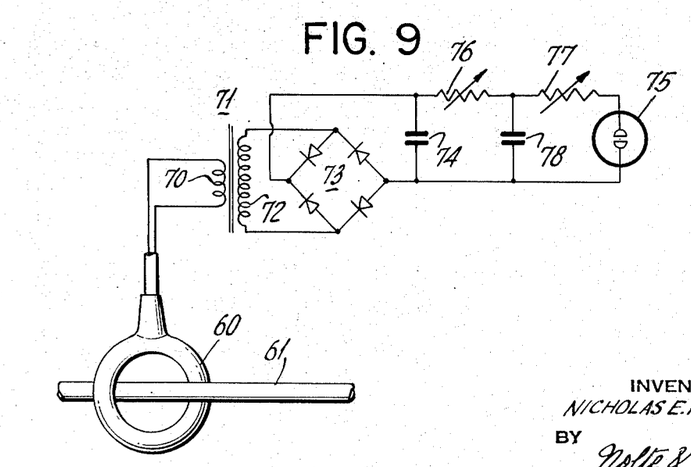
FIG. 9 is a circuit diagram of one embodiment circuit of the fault indicator of FIG. 8.

One embodiment of a circuit according to the system of FIG. 8 is illustrated in FIG. 9. In this embodiment, the secondary winding of the current transformer sensor 60 is connected to the primary winding 70 of a transformer 71. The secondary winding 72 of the transformer 71 is connected to a conventional bridge rectifier 73. The output of the bridge rectifier 73 is connected to a storage capacitor 74, and the voltage across the capacitor 74 is applied to a neon indicator 75 by way of series connected resistors 76 and 77. A timing capacitor 78 is connected between the junction of resistors 76 and 77, and the other output terminal of the bridge rectifier 73. The turns ration of the transformer 71 is selected so that the output voltage of the bridge rectifier 73 is insufficient to light the neon light-up 75 when normal current flows in the cable 61. In this embodiment of the invention, it will be understood, of course, that the transformer 71 may be omitted, so that the current transformer 60 is directly connected to the bridge rectifier, in which case the transformer 60 is selected to provide the proper operating voltage for the indicator circuit as above stated.

In the circuit of FIG. 9, the output of the transformer 71 is rectified in the bridge rectifier 73 to provide a voltage stored on the capacitor 74 that is proportional to the current flowing in the cable 61. Under normal current conditions, this voltage is insufficient to ignite the lamp 75, and consequently, the timing capacitor 78 becomes charged to the same voltage as the capacitor 74, and no current flows in the indicator circuit. In the event that the current in the cable 61 increases above a predetermined level, for example due to a fault condition, the voltage stored on the capacitors 74 will increase, and will result in periodic ignition of the neon lamp 75 during the time that the fault current flows in the cable 61, and for a predetermined time after current has been removed from calbe 61. The blinking of the lamp 75 is produced as a result of the charging of the capacitor 78 from the capacitor 74 by way of resistor 76 to a voltage exceeding the firing voltage of the lamp 75. This results in the discharge of the capacitor 78 by way of timing resistor 77 until the voltage across the lamp 75 reaches the extinction coltage of the lamp 75. The capacitor 78 will thereupon be recharged from the capacitor 74 by way of resistor 76 and the ignition cycle of the lamp 75 will be repeated. The rate of blinking of the lamp 75, at any time during which blinking continues following opening of current in the cable 61 is determined by the relative values of the capacitors 74 and 78, and resistors 76 and 77. Resistors 76 and 77 may be variable resistors in order to permit adjustment of the timing cycle. Thus, resistor 77 may be varied to provide a measure of control over the time during which the lamp 75 is lit during any cycle of oscillation, and the resistor 76 may be varied to provide a pattern of control over the length of time during a cycle that the lamp 75 is extinguished, and the length of time that a blinking action of the lamp 75 occurs following cessation of current in the cable 61.

A modification of a portion of the circuit of FIG. 9 is illustrated in the circuit of FIG. 10. Referring to FIG. 10, the capacitor 74 is adapted to be connected to the bridge rectifier in the same manner as shown in FIG. 9, and thence to the current transformer 60, either with or without the transformer 71 as discussed with respect to FIG. 9. (It is preferred, of course, that the transformer 71 be omitted if possible in order to simplify the system and reduce its cost.) Rather than applying the voltage across the capacitor 74 directly to the blinking indicator circuit, as shown in FIG. 9, however, a magnetic microswitch such as magneitc reed switch 80 is connected between the upper electrode of capacitor 74 and the resistor 76. The microswitch 80 is of conventional type and is mounted in an accessible position, for example, in a plastic dome which also includes the neon lamp 75, so that a technician can readily close the switch by means of a magnet. The blinker thus remains inoperative, even though a fault current condition has occurred in cable 61, until the technician closes the microswitch by passing the magnet close to the plastic dome. The blinker circuit of FIG. 10 includes the series resistor 76, the neon lamp 75, and the capacitor 78 in parallel with the neon lamp, and operates essentially in the same manner as the circuit of FIG. 9.

It will be obvious that the microswitch may be located in other positions in the circuit of FIG. 10, as well as in the circuit of FIG. 9, to permit charging of the capacitor 74 while inhibiting operation of the neon lamp, until the microswitch is closed.

In the arrangement of FIG. 10, it is of course apparent that the time that capacitor 74 can hold a charge corresponding to a fault current is dependent upon the reverse resistance characteristics of the diodes of bridge 73. Since it is desirable that the circuit require a minimum of maintenance, it is of course preferable to employ high quality diodes, and in order that the charge be held for an adequate time, it has been found suitable that diodes having reverse currents in the order of $1 \times 10^{-9}$ amperes at 200 volts are satisfactory. As an example, Sylvana diodes D6625A and 1N487B have been found satisfactory for this purpose when employed in combination with a storage capacitor 74 of 1 microfarad at 400 volts. In this example, the resistor 76 had resistance of 15 megohms, capacitor 78 was 0.25 microfarads, and the lamp 75 was an NE2. These components are cited from the standpoint of illustrating a satisfactory embodiment of the invention, and it is of course apparent that other components may be employed to fit the needs of a given application. In the above example the capacitor 74 held a charge, responsive to fault currents of adequate magnitude to provide a fault indication for several days. In some instances it may be undesirable that a charge be held for such a long period, since it may inhibit proper interpretation of fault conditions due, for example, to the occurrence of a second fault subsequent the correction of the fault which initially effect the charging of the capacitor 74. This problem may be partially obviated by placing a resistor of lower resistance in parallel with the capacitor 74, to limit the charge holding capacity of the circuit to a desired time, for example, of 6 hours. The use of such a resistor is preferable to employing diodes of lower reverse current and lower quality.

Figure 11:
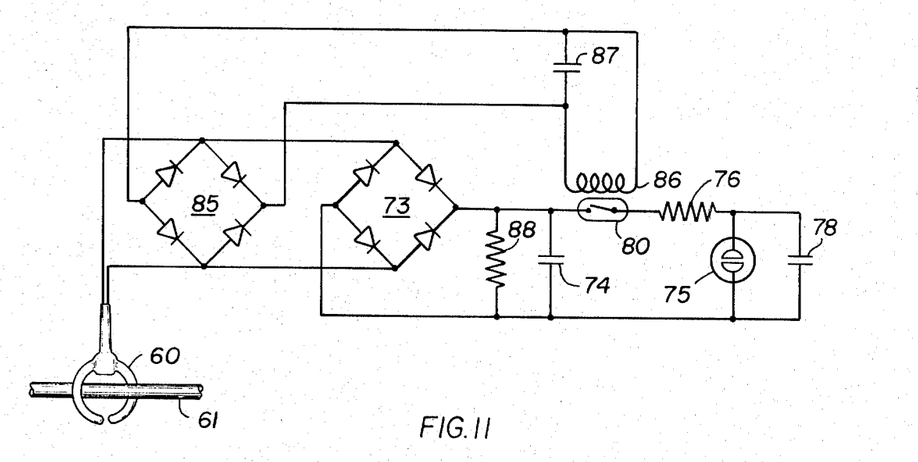
FIG. 11 is a circuit diagram of still another embodiment of a fault indicator which may be employed in the present invention.

In a further modification of the invention, as illustrated in FIG. 11, a circuit is provided which is automatically reset upon restoration of normal current in the cable 61. In this circuit, as in the circuit of FIGS. 9 and 10, a potential transformer 60 is coupled to the cable 61. The output of the transformer 60 is connected to diode bridge 73 either directly, as indicated in FIG. 11, or by way of an additional transformer as illustrated in FIG. 9. The output of the diode bridge 73 is connected to charge capacitor 74, with the capacitor 74 being connected to the lamp 75 in the same manner as illustrated in FIG. 10. In addition, a second diode bridge 85 is also connected to the output of the transformer 60, with the output of the bridge 85 being connected to a coil 86. The coil 86 is located in the proximity of the reed switch 80, for example, by encircling the envelope of the reed switch, so that the switch 80 is closed in response to a current output of the bridge 85 corresponding to normal current flow in cable 61. A smoothing capacitor 87 may be connected in parallel with the coil 86.

In the arrangement of FIG. 11, a fault current in cable 61 will affect the charging of capacitor 74 to a sufficient voltage to provide fault indication on the indicator 75 upon actuation of the switch 80. The current in cable 61 will also produce a current in coil 86 adequate to close the switch 80, thereby producing a visual indication of the fault current, but this will not affect the operation of the circuit since the capacitor 74 is continuously being charged while the fault current lasts. When line protected devices have opened the circuit of cable 61, the switch 80 will consequently also be opened, thereby maintaining the charge on capacitor 74 until an operator has a chance to magnetically operate the switch, as in the arrangement of FIG. 10. If, however, the normal current is restored before the indicator is inspected by an operator, the switch 80 will be closed by coil 86, to effect the discharge of capacitor 74 by way of the flashing indicator circuit. This is desirable, since in many instances it may not be necessary to inspect each indicator on the line, and the circuit is restored to its initial condition for detecting the next occurrence of a fault as soon as possible, without the intervention of an operator. The arrangement provides the additional advantage that the circuit is restored to its operating condition even following a momentary surge on the line, in which case it would not be necessary to inspect the device.

In FIG. 11, a resistor 88 is shown connected in parallel with the capacitor 74, for the reasons above stated with respect to FIG. 10, i.e., to provide a predetermined charge holding time for the circuit. This resistor is of course optional in the circuit of FIG. 11.

Figure 12:
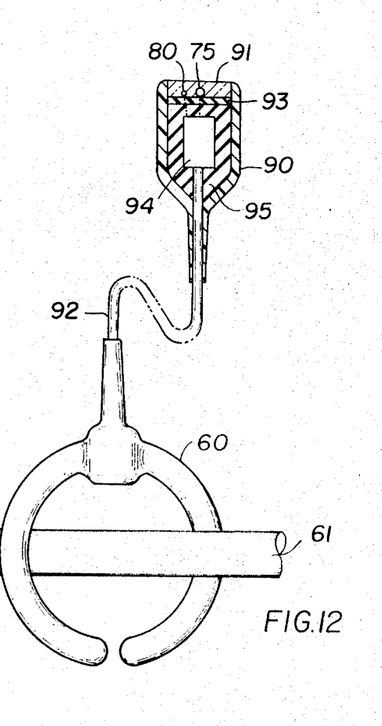
FIG. 12 is a schematic view of a cable fault detector according to the invention, according to the modifications thereof illustrated in FIGS. 8-11, with the indicator being illustrated in cross-section.
Figure 13:
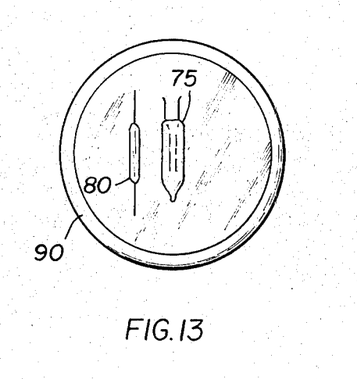
FIG. 13 is an end view of the indicator of the cale fault detector illustrated in FIG. 12.

The circuits of FIGS. 9–11 are readily adaptable to encapsulation in small economical waterproof units, as illustrated in FIGS. 12 and 13. Referring to FIG. 12, a cylindrical housing 90 is provided with a sealed transparent window 91 on one end thereof, with the other end of the housing 90 having a reduced diameter and being sealed by suitable means to the cable 92 extending to the transformer 60. A suitable component board 93 is provided within the housing 90 and visible through the window 91. The neon lamp 75 and, in the cases of FIGS. 10 and 11, the reed switch 80, are mounted on the upper side of the board 93, so that these components are readily visible. The window 91 may be of a plastic material and may, for example, be molded directly in the end of the housing and encapsulating the components on the board 93. The remaining components of the circuit are mounted in the housing 90 below the board 93 in a unit 94, which may be totally encapsulated in the housing 90 by suitable encapsulation material 95. The end view of the indicator of FIG. 12 is illustrated in FIG. 13, wherein it is shown that the neon bulb 75 is readily visible to an operator. The switch 80 may be readily closed by an operator by placing a magnet, which may be conveniently on the end of an operator-held stick, close to the end of the indicator.

Since the resetting circuit including the bridge 85 and coil 86 need not maintain a charge, the reverse current of the diode bridge 85 may be considerably less than that of the diode bridge 73.

Figure 14:
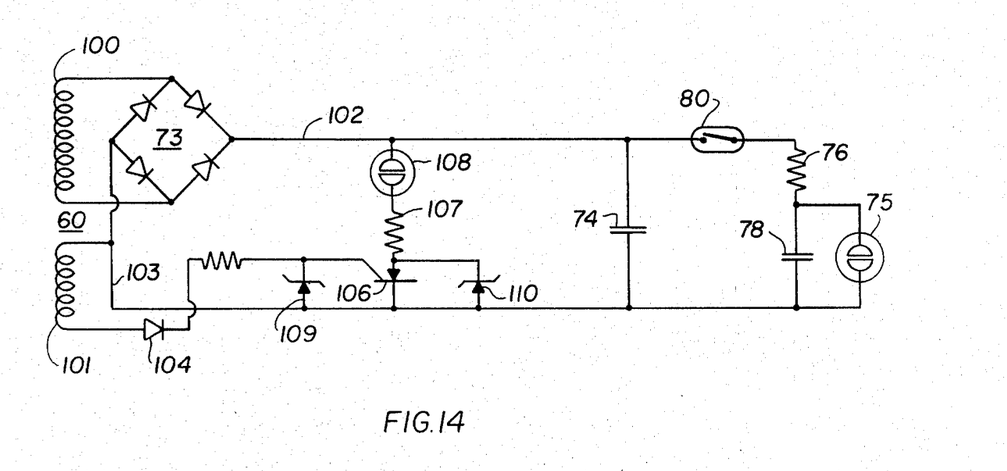
FIG. 14 is a schematic diagram of a modification of the system of FIG. 11.
Figure 15:
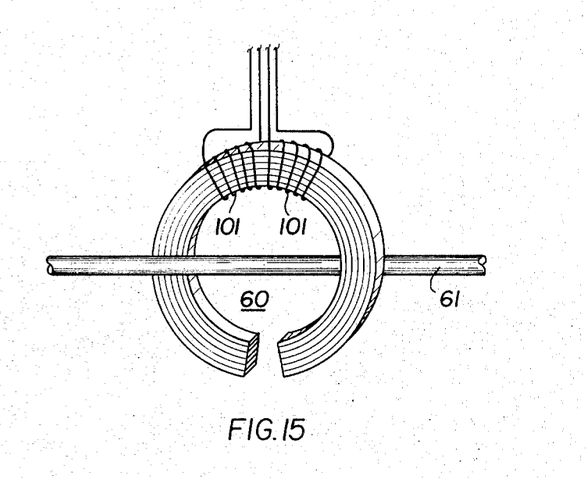
FIG. 15 is a simplified sketch of the potential transformer employed in the circuit of FIG. 14.

An alternative arrangement for resetting the circuit is illustrated in FIG. 14. In this circuit, the potential transformer 60 has two windings 100 and 101, as shown in FIG. 15. As in the arrangement of FIG. 11, the winding 100 is connected to the bridge rectifier 73, the output of the bridge rectifier is connected to the storage capacitor 74 by way of leads 102 and 103, and the neon lamp 75 is connected to the storage capacitor by way of series reed switch 80 and resistor 76 and shunt capacitor 78. This portion of the circuit operates in the manner previously described, to provide a blinking indication of the lamp 75 when the reed switch 80 is close by an operator and the storage capacitor has a charge responsive to the overload in the cable linked to the potential transformer.

One end of the second winding 101 of the potential transformer is connected to the lead 103, and the other end of this winding is connected by way of rectifier 104 and current limiting resistor 105 to the gate of silicon controlled rectifier 106. The cathode of SCR 106 is connected directly to the lead 103, and the anode of the SCR is connected to lead 102 by way of current limiting resistor 107 and neon lamp 108. The rectifier 104 and bridge rectifier 73 of course have the proper polarity to provide the necessary voltages for the date and anode circuits of the SCR 106. A Zener diode 109 is connected between the gate and cathode to trigger the gate electrode and a Zener diode 110 is connected between the anode and the cathode of the SCR 106 for surge protection.

When normal current flows in the power line cable, the storage capacitor will not be charged to a sufficiently high potential to light and indicating lamp 75 if the reed switch is closed by an operator. As in the arrangement of FIG. 11, an overload current in the power line charges the capacitor 74 sufficiently to effect a blinking indication of lamp 75 when the switch 80 is closed by an operator. In order to automatically discharge the capacitor 74 when current is restored in the power line, the neon lamp 108 and SCR 106 form a discharge path that is closed whenever current in the power line is of sufficient magnitude to trigger the gate of the SCR 106. Since a separate potential transformer winding is employed for the trigger circuit, the winding 101 may be designed so that the SCR is triggered at very low line current, and the design of the discharge circuit is thus independent of the design of the indicator circuit. While the lamp 108 is ignited during normal current conditions and when an overload circuit occurs, if the SCR is still triggered by line current, this does not present any problems since it does not adversely effect the remainder of the circuit and since the lamp 108 may if desired be mounted so it is not visible. The circuit of FIG. 14 is very reliable since solid state components are employed, and hence the circuit requires a minimum of service. Alternatively, if desired, the second winding 101 of the potential transformer can be omitted, and the rectifier 104 connected to the winding 100 to trigger the SCR 106, in order to simplify the structure of the potential transformer.

It is to be understood that the embodiments described are shown for purposes of illustration, and that various changes can be made thereto without departing from the spirit and scope of this invention which are defined in the appended claims.

What is claimed is:

1. An overload indication device for indicating an overload current in an electric power cable, comprising a potential transformer adapted to be inductively coupled to said cable, a visual indicator, and an interconnecting cable for interconnecting said transformer and said indicator, said indicator comprising a lamp flashing circuit which produces a characteristic visual flashing indication in response to the application thereto of a potential exceeding a given magnitude, a capacitor, rectifier means for applying the output of said transformer to said capacitor, and switch means for applying the potential across said capacitor to said flashing circuit, whereby said flashing indicator circuit provides a visual indication of overload current in said power cable, and a discharge circuit for discharging said capacitor comprising a short circuit, and means coupled to said transformer for automatically connecting said short circuit to said capacitor in response to current flow in said cable.

2. The overload indication of claim 1 in which said flashing circuit comprises a neon lamp, capacitor connected in parallel with said lamp, and resistor means connected in series with the parallel combination of said lamp and said capacitor means.

3. The overload indication device of claim 1 in which said electric power cable is an underground cable, wherein said transformer, visual indicator and interconnecting cable are totally enclosed in waterproof insulation, the waterproof enclosing of said visual indicator comprising a hollow cylindrical waterproof member having one end sealed to said interconnecting cable and a waterproof transparent window covering the other end thereof, said rectifier means, capacitor storage means and flashing circuit being enclosed within said cylinder and including lamp indicating means visible through said window.

4. The overload indication device of claim 1, wherein said potential transformer has a first winding coupled to said rectifier means for charging said capacitor, and a second winding coupled to said discharge circuit for automatically discharging said capacitor in response to current flow in said power cable.

5. The overload indication device of claim 4, wherein said discharge circuit comprises a silicon controlled rectifier and a discharge lamp, means serially connecting said lamp and the anode-cathode circuit of said silicon controlled rectifier to discharge said capacitor and means coupling said second winding to the gate of said silicon controlled rectifier.

6. The overload indication device of claim 1 wherein said means for applying the potential across said capacitor to said flashing circuit comprises a normally open, magnetically operated swithc.

* * * * *